Patented Aug. 7, 1945

2,381,855

UNITED STATES PATENT OFFICE 2,381,855

RAW MATERIAL FOR RESIN SYNTHESIS

Le Roy U. Spence, Elkins Park, and Charles H. McKeever, Philadelphia, Pa., assignors to The Resinous Products & Chemical Company, Philadelphia, Pa., a corporation of Delaware No Drawing. Application August 7, 1942,
Serial No. 454,077

2 Claims. (Cl. 260—637)

This invention relates to the production of raw materials suitable for the preparation of synthetic resins. It relates to the production of a new raw material, containing pentaerythritol and calcium formate, which, when reacted with rosin, yields resins which are clear and homogeneous in appearance and completely soluble in the vegetable oils customarily used in varnish-making.

It is well known that formaldehyde and acetaldehyde react, under the catalytic effect of alkaline materials such as lime, to form pentaerythritol and other by products, including sugars. Several modified processes have been developed for conducting this reaction, and the effect of such factors as time and temperature of reaction, concentration of reactants and modifying agents have been studied and disclosed in such patents as U. S. 1,678,623, 1,716,110, 2,152,371, 2,170,624, 2,186,272, 2,206,379, 2,223,421 and 2,240,-734. The main reaction which takes place in an alkaline medium is usually represented by the following equation:

$$4CH_2O + CH_3CHO + MOH \rightarrow C(CH_2OH)_4 + HCOOM$$

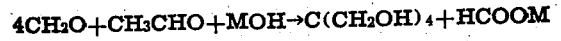

in which M is a monovalent metal or the equivalent of a polyvalent metal. It is known that many side-reactions may occur with the production of a mixture of by-products as well as pentaerythritol, but in the discussion which follows, the term "pentaerythritol" is used to cover all of the organic products of the reaction. After the completion of the above reaction, it has been customary to add sulfuric acid to the mixture to effect precipitation of the calcium as the relatively insoluble sulfate, liberating the formic acid. The strongly acid solution is then evaporated and the pentaerythritol is isolated by crystallization. Another method involves addition of sodium carbonate, which precipitates calcium carbonate and leaves sodium formate in solution. The solution is then concentrated and the pentaerythritol is separated from the sodium formate by fractional crystallization.

Pentaerythritol has been suggested as a raw material in the preparation of oil-soluble synthetic resins suitable for use in varnish making. The pentaerythritol may be used in place of some or all of the glycerine normally used in the preparation of esterified rosin, known in the varnish industry as "ester gum." The resins may be further hardened by the use of maleic anhydride or maleic acid. However, it has been found that the pentaerythritol prepared as above noted tends to produce turbid resins, which in turn give turbid varnishes due to the presence of small amounts of impurities such as calcium sulfate or sodium formate.

The present invention provides a method of producing a new raw material which may be used in conjunction with rosin to yield resins which are free from turbidity themselves and which can be used in the preparation of clear homogeneous varnishes. This method also gives a higher yield of the pentaerythritol and avoids the expense of the crystallizations formerly necessary to produce a raw material of satisfactory purity. The method comprises reacting an aqueous solution of formaldehyde and acetaldehyde in the presence of lime until the aldehyde content has fallen to less than 4%, neutralizing the reaction mixture with formic, acetic, or propionic acid until a pH of about 5.5 to about 6.5 is reached, separating any insoluble extraneous matter, and concentrating the desired product. The preferred procedure comprises reacting a solution of about 4 to 5 mols of formaldehyde and 1 mol of acetaldehyde in the presence of about .5 to .7 mol of lime at a temperature of 30°–45° C. for about two hours or until the aldehyde content of the mixture has fallen to about 2 to 4%. Thereafter, the remaining small amount of lime in the mixture is neutralized with formic acid, acetic acid or propionic acid (as contrasted with sulfuric acid used in previous processes). The product obtained contains substantially all of the pentaerythritol and organic by-products obtained in the reaction and at least part of the calcium formate. In this way, the yield of useful compounds obtained is 85–95% of theory, compared with 60–75% by previous methods.

The product obtained can be used directly in the preparation of rosin modified resins or may be further concentrated before being used in the formation of resins. In contrast to the pentaerythritol prepared by using sulfuric acid to neutralize the lime, this material, containing for the most part calcium formate and pentaerythritol, will react readily with rosin to produce clear resins. The calcium formate which is present apparently reacts with the high boiling acids of the rosin to form calcium abietate or "limed rosin" as it is better known in the trade. The pentaerythritol in turn serves to esterify the rosin acids and produce a clear homogeneous resin of high melting point. Any calcium salts of acetic or propionic acids which may be present will react in a manner similar to calcium formate. The formic acid evolved in the preparation of the resins may be recovered.

The proportion of calcium formate to pentaerythritol in the product may be altered over a wide range to suit the requirements of the type of resin to be made from it. After the acidification of the pentaerythritol reaction mixture, the solution is filtered while hot to remove the insoluble matter in the lime, and the resulting solution used in this state or after concentration without removal of any calcium formate. This procedure gives a product which contains 30-35% calcium formate based on the total solids.

If removal of part of the calcium formate is desired, the solution is concentrated, preferably under reduced pressure to prevent discoloration, and is then filtered at a temperature of 90° to 110° C. to remove solids consisting chiefly of calcium formate. Obviously, other methods of separating the solids from the liquid may be employed, such as centrifuging, etc. Calcium formate is almost as soluble at room temperature as at 100° C. (16 grams per 100 grams of water at 0° C., and 18 grams per 100 grams at 100° C.) while the solubility of pentaerythritol increases rapidly with temperature (6.27 grams per 100 grams at 20° C., and 98 grams per 100 grams at 100° C.). In the condensation of acetaldehyde and formaldehyde, the usual proportions of reactants and water used give a product containing 20-40% total solids. This product can be concentrated and filtered at about 100° C. to give a filtrate containing 50 to 60% solids without much loss of pentaerythritol in the filter cake. The filter cake can be washed with water to recover pentaerythritol whereupon the washings may be returned to the next batch for concentration so that practically no loss of pentaerythritol and the other useful by-product occurs. The calcium formate content of the product is thereby varied over the range of 35% to 12% of the total solids. For example, the following table indicates the results obtained at various concentrations of the filtrate:

| Total solids in filtrate | Calcium formate in solids |
|---|---|
| Percent | Percent |
| 35 | 34 |
| 40 | 26 |
| 45 | 21 |
| 50 | 17 |
| 60 | 12 |

The filtrate on cooling to room temperature becomes a slurry containing pentaerythritol crystals and may be used in this form for the preparation of resins or may be further dried to produce a solid product by various well-known means such as spray drying or drum drying.

The method of reacting the formaldehyde and acetaldehyde in the presence of lime may be varied without departing from the spirit of the invention. The main and novel steps of the invention are the neutralization of the remaining free lime with formic, acetic or propionic acids to stop the progress of the reaction, and the recovery of a product containing varying amounts of calcium formate by evaporation and filtration of the hot liquor. The amount of the acids which is required is very small inasmuch as most of the lime is already neutralized by the formic acid produced in the reaction, as shown in the equation above. Also, as emphasized above, the inorganic substances left in the reaction mixture are compatible with the resin, while the previous processes left insoluble substances such as calcium sulfate and sodium formate in the reaction mixture. The number and amounts of the chemicals required are also reduced and the process of working up the products is simplified by the elimination of the crystallization of the product, all of which represents considerable economy in manufacture.

The following examples serve to illustrate this invention:

Example 1

Twenty-four hundred grams of water and 182 grams (2.32 mols) of 94% lime were placed in a 5-liter 3-necked flask, equipped with thermometer, stirring device and dropping funnel. While the contents of the flask were being stirred, 16.6 mols of formaldehyde, as a 37% solution, was added. The mixture was quickly warmed to 30° C., and 4 mols of acetaldehyde was added at a constant rate over a period of 45 minutes. The tip of the funnel through which the acetaldehyde was added extended below the surface of the mixture. During the first 10 minutes of the addition of the acetaldehyde, the temperature rose to 42° C. due to the exothermic nature of the reaction, and thereafter the temperature was maintained at 40-44° C. After all of the acetaldehyde had been added, the mixture was held at 40-44° C. and stirred for one hour. At this point, about 98% of the aldehydes had condensed as shown by analyses for the remaining aldehydes by the method of Adams & Adkins (J. A. C. S. 47, 1938). Thirty cc. of formic acid, in 50% solution, was then added until a pH of 5.5-6.5 was reached. The solution was filtered, evaporated to a weight of 1600 grams under reduced pressure, then heated to 95° C. and the solids separated as rapidly as possible at this temperature.

The remaining solution was analyzed for calcium by the standard oxalate method, and the results converted to equivalents of calcium formate. Total solids were determined by the Carl Fischer method. The amount of pentaerythritol was calculated by difference. The analysis showed: 45.3% total solids, of which 8.9% was calcium formate and 36.4% pentaerythritol. This was equivalent to a 92% yield.

Example 2

To a molten adduct of 100 parts by weight of rosin and 3.63 parts of maleic anhydride were added 4.63 parts of glycerine and 22.6 parts of the raw material obtained in Example 1 above. The water was evaporated from this mixture by heat, and the remaining resinous mass was then heated to 275-280° C. and held at this temperature until the acid number had fallen to 17. During the course of the heating, part of the formic acid, liberated from the calcium formate by action of abietic and other rosin acids, was decomposed and escaped as carbon monoxide while the balance distilled off unchanged. The carbon monoxide served in part to blanket the surface of the resin and prevent oxidation, which ordinarily causes poor color in the resin. The resin was poured out and cooled. It was found to have a melting point of 110° C., as determined by the capillary tube method, and was entirely clear.

A varnish, of 50% solids content, prepared by cooking 100 pounds of this resin in 25 gallons of bodied linseed oil (viscosity Z4 on Gardner-Holdt scale) had excellent properties such as clarity, drying rate, and chemical resistance.

Example 3

The solution prepared by the method of Example 1 was concentrated to a solids content of 55% at the boiling point and the solids separated therefrom. The resultant solution was then cooled to 10° C., during which crystallization took place. The solids were separated from the liquid and were found to be 97% pentaerythritol and 3% calcium formate. One wash of the solids with half their weight of cold water reduced the content of calcium formate to less than 1%. The yield of pentaerythritol was 74% of theory.

Example 4

To a molten adduct of 100 parts by weight of rosin and 3.96 parts of maleic anhydride, protected by an atmosphere of $CO_2$, were added 7.04 parts of glycerine and 7.25 parts of the raw material containing 97% of pentaerythritol as prepared in Example 3. The mixture was heated to 275–280° C. and held at this temperature for 4½ hours, at which time the acid number had fallen to 14. The resin, which had a melting point of 105° C., was clear and exceptionally light in color, W W on the customary rosin scale, and produced an especially fast-drying varnish when cooked into oil.

Whereas this application relates to the preparation of a raw material containing pentaerythritol suitable for the preparation of rosin-modified synthetic resins, application Serial No. 454,076, filed simultaneously, claims the process of preparing pure pentaerythritol from this raw material.

We claim:

1. In the process of preparing pentaerythritol by the condensation in aqueous solution of about four mols of formaldehyde and about one mol of acetaldehyde in the presence of about 0.6 mol of lime until the aldehyde content of the mixture is about 2% to 4%, the improvement which comprises the step of neutralizing the lime, after said condensation, with an acid from the group consisting of formic, acetic, and propionic acids.

2. In the process of preparing pentaerythritol by the condensation in aqueous solution of about four mols of formaldehyde and about one mol of acetaldehyde in the presence of about 0.6 mol of lime until the aldehyde content of the mixture is about 2% to 4%, the improvement which comprises the step of neutralizing the lime, after said condensation, with formic acid.

LE ROY U. SPENCE.
CHARLES H. McKEEVER.